US007085822B1

(12) United States Patent (10) Patent No.: US 7,085,822 B1
Donatelli et al. (45) Date of Patent: Aug. 1, 2006

(54) MANAGING PERVASIVE DEVICES

(75) Inventors: Alessandro Donatelli, Rome (IT);
Fabrizio Loppini, Rome (IT); Mattia de Rosa, Rome (IT); Francesco Riccio, Rome (IT)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 09/576,696

(22) Filed: May 23, 2000

(30) Foreign Application Priority Data

Mar. 14, 2000 (GB) ................................. 0006055.8

(51) Int. Cl.
*G06F 9/45* (2006.01)
*G06F 15/177* (2006.01)

(52) U.S. Cl. ........................ 709/220; 717/173; 717/178
(58) Field of Classification Search ................ 709/227, 709/245, 206, 207, 221, 222, 220; 717/173, 717/178
See application file for complete search history.

(56) References Cited

U.S. PATENT DOCUMENTS

| | | | | |
|---|---|---|---|---|
| 6,000,000 A * | 12/1999 | Hawkins et al. | ............. | 707/201 |
| 6,012,088 A * | 1/2000 | Li et al. | ....................... | 709/219 |
| 6,029,196 A * | 2/2000 | Lenz | ........................... | 709/221 |
| 6,119,157 A * | 9/2000 | Traversat et al. | ........... | 709/220 |
| 6,161,133 A * | 12/2000 | Kikinis | ........................ | 709/220 |
| 6,219,694 B1 * | 4/2001 | Lazaridis et al. | ........... | 709/206 |
| 6,256,668 B1 * | 7/2001 | Slivka et al. | ................ | 709/220 |
| 6,330,618 B1 * | 12/2001 | Hawkins et al. | ............. | 709/248 |
| 6,373,817 B1 * | 4/2002 | Kung et al. | .................. | 370/217 |
| 6,457,030 B1 * | 9/2002 | Adams et al. | ............... | 715/523 |
| 6,477,565 B1 * | 11/2002 | Daswani et al. | ............. | 709/217 |
| 6,493,751 B1 * | 12/2002 | Tate et al. | ................... | 709/221 |
| 6,493,871 B1 * | 12/2002 | McGuire et al. | ............. | 717/173 |
| 6,496,979 B1 * | 12/2002 | Chen et al. | .................. | 717/178 |
| 6,560,604 B1 * | 5/2003 | Fascenda | ..................... | 707/10 |
| 6,854,009 B1 * | 2/2005 | Hughes | ........................ | 709/220 |

* cited by examiner

*Primary Examiner*—Saleh Najjar
*Assistant Examiner*—David Lazaro
(74) *Attorney, Agent, or Firm*—Gerald R. Woods

(57) ABSTRACT

A management system comprises a gateway component adapted to reside on a workstation and a device agent adapted to reside on a pervasive device for configuring pervasive devices. The gateway component is instantiable during synchronization of the workstation with a pervasive device to transfer the device agent to the pervasive device; and to transmit configuration information to the pervasive device. The device agent executes configuration commands in response to the configuration information. The invention enables pervasive devices to be managed through a workstation to which they connect to synchronize without requiring any intervention by the pervasive device user. Preferably, the workstation acts as a gateway for managing the device within what becomes a four tier management system.

4 Claims, 4 Drawing Sheets

MANAGING PERVASIVE DEVICES

FIELD OF THE INVENTION

The present invention relates to a management system for pervasive devices.

BACKGROUND OF THE INVENTION

A brief overview of a prior art three tier management system is shown in FIG. 1. Here, a management server 10 communicates with management agent 12 resident on an endpoint computer workstation 14 (only one shown) via a gateway 16 (only one shown).

A well known example of such a system is Tivoli Software Distribution Version 3.6. Detailed information about the features offered by this product are available at in *New Features in Tivoli Software Distribution* from International Business Machines Corporation, Part #SG24-2045-0, ISBN 0738401099.

In a Tivoli system, each enabled endpoint 14 communicates with a gateway 16 via any peer-to-peer protocol, for exam TCP/IP, IPX or SNA. Communication between the server 10 and the gateway 16 is via an ORB (Object Request Broker) 18',18", connection where each endpoint connected to a gateway is addressed by the server through an associated object on the gateway ORB 18", thus enabling the endpoint to be directly addressed by the server. A management agent 12 known as a Lightweight Client Framework (LCF), resident on the endpoint, is thus accessible by the server and enables the server to push software via the gateway to the endpoint and call methods on applications resident on the endpoint. The server in turn runs programs 20, 22, 24 allowing: software to be selected for distribution to specified endpoints or defined groups of endpoints; endpoint software inventories to be obtained; and endpoint activity to be monitored via an Event Console, and these programs are extended for each endpoint platform to be managed.

While this management system has been quite successful, it should be noted that in order to control any endpoint 14, the endpoint must itself be manually enabled by installing the LCF client 12 on the endpoint and configuring the LCF client accordingly, for example, setting up its gateway address and communication protocol.

At the same time more and more users are employing Tier 0 or pervasive devices ("devices") 26 including, for example, Palm Computing® platform devices ("Palm devices") from Palm Inc., a range of organizers from Psion plc and to a growing extent mobile and smart phones. Typically data on such pervasive devices 26 is managed locally by periodically connecting the pervasive device to a workstation 12 running a controller program 28 and synchronising one or more databases stored on the device, for example an address book, with corresponding databases stored on the workstation.

In the case of a Palm device, a workstation application called HotSync® Manager controls the synchronisation of databases as well as the installation of new applications. HotSync uses one or more plug-ins known as conduits, each for exchanging and synchronising data between the workstation 14 and the Palm device 26. Most conduits synchronise data such that data on the device mirrors the data on the workstation, although/others also transfer, import/export data, or cause Palm applications to be installed.

One of the default conduit modules (netcond.dll) responds to a user placing a Palm Network Configuration (.PNC) file in a pre-determined sub-directory prior to synchronisation. The file is copied to the device by the conduit module where it is used to update the script file for a modem. This, however, is extremely limited in terms of aspects of the device that may be configured. Also, the Palm desktop 28 includes a set-up menu, but this only enables a user to set workstation side modem and network parameters. If these are at odds with the Palm device, then errors can occur.

Because configuration facilities are so limited, perhaps because of the problems of trying to access databases on the pervasive device which might be in use and so locked or unavailable, thus causing such facilities to operate unreliably, new users of pervasive devices may end up spending more time than is necessary manually configuring the devices before using them profitably. Even the provision of a configuration program per se is not as helpful as it might be, because if it is to avoid the problem of accessing databases which might be locked during synchronisation, it needs to run separately to device synchronisation and thus places an extra burden on the user. This also make the management of such devices within a tiered structure more difficult.

If such pervasive devices are to be employed more efficiently within an enterprise, then they need to be quickly and easily configurable as well as capable of receiving and having enterprise applications and data updated as seamlessly as possible, preferably, within the same framework used to manage other resources within the enterprise.

SUMMARY OF THE INVENTION

Accordingly the present invention provides a management system comprising a gateway component adapted to reside on a workstation and a device agent adapted to reside on a pervasive device for configuring pervasive devices; said gateway component being instantiable during synchronisation of said workstation with a pervasive device and comprising: means for transferring said device agent to said pervasive device; and means for transmitting configuration information to said pervasive device; and said device agent comprising means for executing configuration commands in response to said configuration information.

The invention enables pervasive devices to be managed through a workstation to which they connect to synchronise without requiring any intervention by the pervasive device user. Preferably, the workstation acts as a gateway for managing the device within what becomes a four tier management system.

BRIEF DESCRIPTION OF THE DRAWINGS

Embodiments of the invention will now be described with reference to the accompanying drawings, in which.

DETAILED DESCRIPTION

Figure 1:
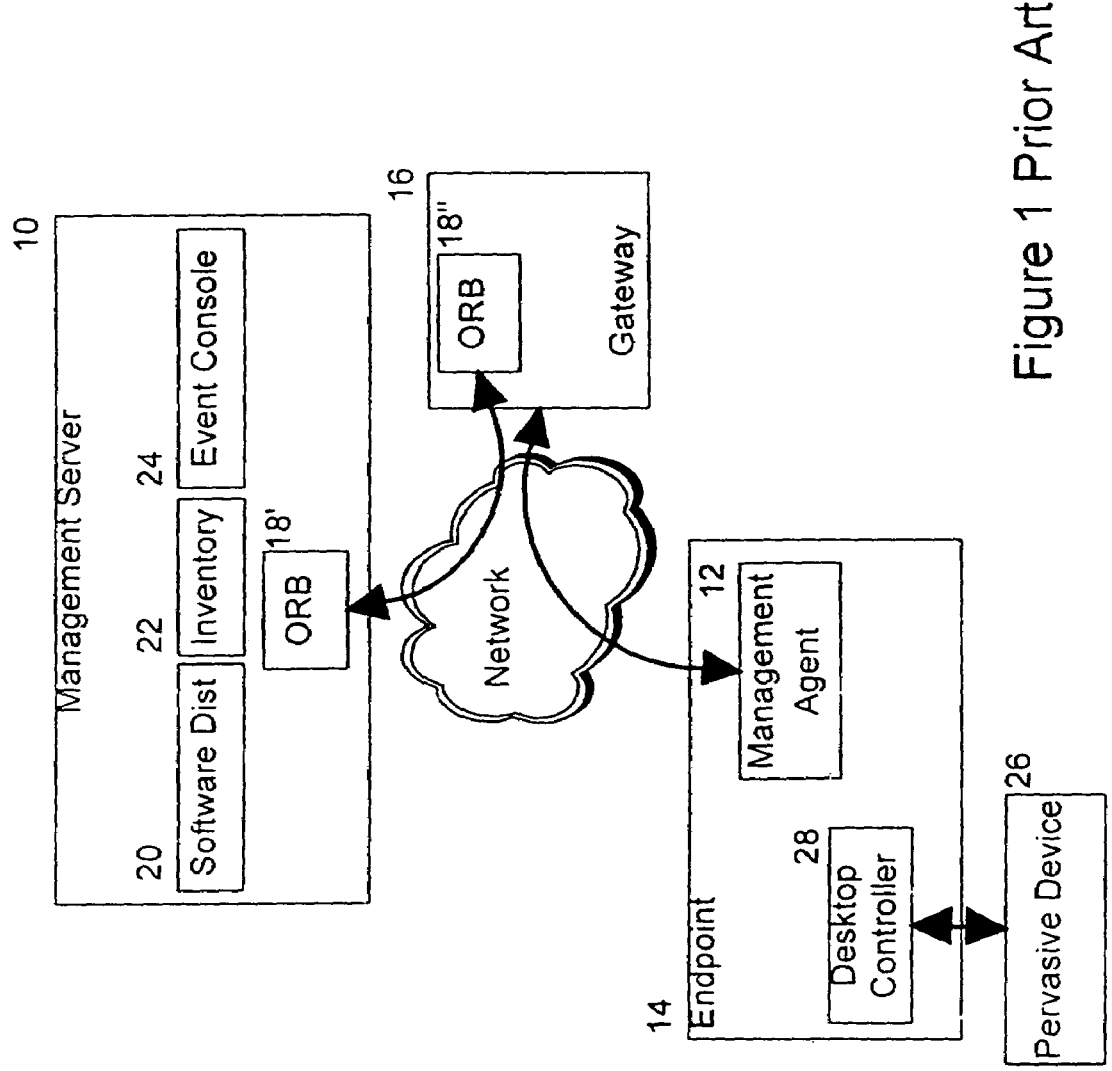
FIG. 1 is a schematic diagram of a prior art three tier management system.
Figure 2:
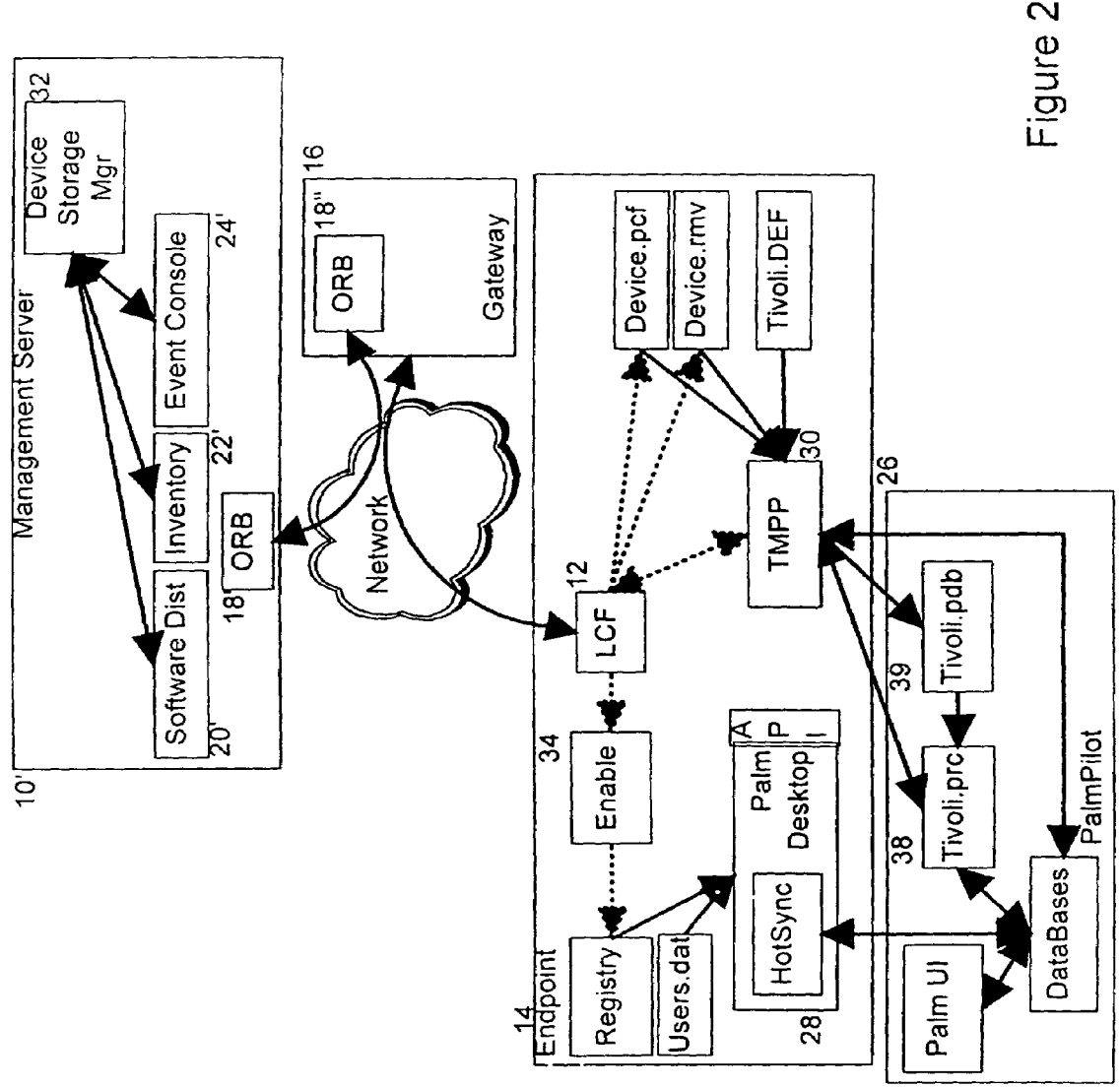
FIG. 2 is a schematic diagram of a four tier management system for controlling pervasive devices.

In the preferred embodiment of the present invention, FIG. 2, the prior art management server is extended to provide respective inventory, software distribution and event console programs 20', 22', 24' for each pervasive device type to be managed by the system.

It can be seen, however, that there are likely to be many more pervasive devices 26 than the endpoints 14 traditionally managed within such a system and so addressing each such device 26 via a respective object on the gateway ORB 18" would be too onerous. The management system therefore treats such devices 26 as residing on a fourth tier in the management system, with each device being managed via an agent 30 resident on a suitably enabled endpoint. Thus, each enabled endpoint 14 acts as a management gateway for devices.

The management server 10' employs a device storage manager 32 which contains the information about the device types and instances of devices being managed. For example, a device type of "Handheld Device" contains many instances of this type of device. This allows any management server applications and users to add devices, edit devices, delete devices, and query for devices. Each such device in the system is identified by 5 pieces of information:
1. Device Type
2. ID—a unique identifier assigned by the system to each device
3. Label—a friendly name for a device, specified at creation time. A Type plus a Label should uniquely define a device.
4. Manager—the identity of an endpoint which is to act as a management gateway for this device.
5. Local Address—the local address of a device in the context of its management gateway Manager is the gateway object reference through which to route management operations (using method calls) toward a given device, thus the server-gateway ORB 18',18" need only handle the same number of object references as within a three tier management system. It should therefore be seen that, even though the number and level of devices being managed within the system of the preferred embodiment is magnified, the use of a single ORB object not only to address the endpoint with which it was traditionally associated, but to manage essentially a hierarchy including an endpoint and a plurality of devices, prevents the endpoint addressing mechanism from collapsing from the sheer number of devices being controlled.

Local Address is an address for a device at least unique in the context of its management gateway. So, using this information, it is possible to locate and manage any device in the management system. This scheme also allows for every device to have a unique ID and a unique friendly name (Label).

In the preferred embodiment, the device storage manager 32 encapsulates how the device data is stored and managed. Thus, the device storage manager and other applications such as the programs 20', 22' and 24' only need to agree on a data exchange protocol so that messages can be exchanged. Using this mechanism, the management server 10' is able to support arbitrary Storage Manager implementations (e.g. disk files, LDAP servers, RDBMS)

Furthermore, the management server 10' provides a device grouping mechanism which is a managed resource capable of managing groups of devices. A device group can be a subscriber to a conventional Profile Manager. This enables devices to be managed via management by subscription paradigm. The device group also implements policy and security for devices. Device groups can thus be made managed resources of Policy Regions, and so it is possible to create custom policies for device group instances and to enforce security models for devices through the Policy Region mechanism. By granting access to device groups on a per Policy Region basis, administrators may be selectively granted access to create device groups, manage subscriptions to device groups, and to manipulate device groups distributions. This depends on roles each administrator holds in each Policy Region and is normal policy and security.

So, using the above methodology, the management system is able to identify endpoints 14 which are to act as management gateways for pervasive devices 26, and the management of such devices will now be discussed in relation to Palm devices in particular.

Figure 3:
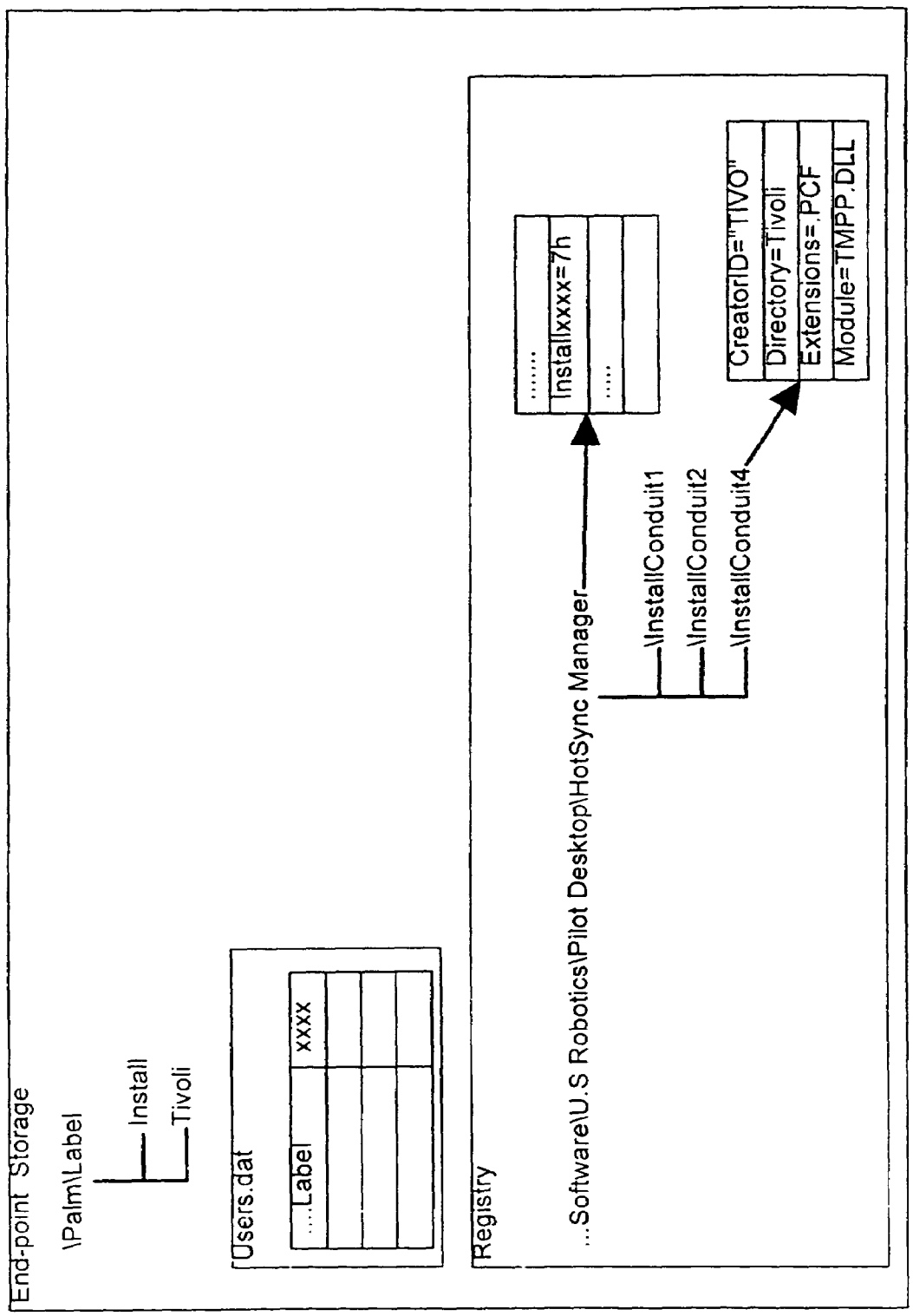
FIG. 3 is a diagram of data stored on an endpoint through which Tier 0 Palm Pilot devices are managed according to the invention.

In order to enable endpoints as management agents for Palm devices, the endpoint 14 must first have a Palm desktop 28 installed. This can be done either manually on the workstation 14 or through the management server 10' deploying and running the Palm desktop installation software in a conventional manner. During installation of the Palm desktop on a Windows platform, certain changes are made to the Windows registry, FIG. 3, in particular, to the HotSync Manager branch of the registry which includes two default conduits. Each conduit branch on an endpoint is given a name "Conduit x", where x is an ordinal number unique on the endpoint. Each conduit branch includes, inter alia, the following set of variables:

Module, which tells HotSync which DLL program is associated with the conduit; Extensions which conventionally indicates to the DLL which file types it is to synchronise with the Palm device;

Directory tells the DLL the name of the device sub-directory in which to find the files to synchronise; and Creator ID which a special four character string associated with each conduit program.

Conduit 1, is the install conduit and installs/synchronises Palm applications (.prc files) and databases (.pdb files) stored in an "install" sub-directory for a particular device. Every .pdb database requires the .prc application that will access that database type. Where Palm VII devices and 3.2 Palm OS are being managed then Palm Query Applications (.pqa) files are also handled by the install conduit.

Conduit 2, operates on Palm Network Configuration Files (*.pnc) also called Palm Network Script Files (*.scp) stored in a "TCP" sub-directory for a particular device. The conduit module interprets the lines contained in the .pnc and .scp files to execute on the device a restricted set of network operations like: "wait for", "Send", "Send CR", "Send User ID", "Send Password", "Delay", "End".

Once the desktop controller 28 is installed, an enabling program 34 and a management agent 30, TMPP.DLL, can be injected into the endpoint 14. The enabling program adds a further conduit branch to the registry. The program 34 detects installed conduits and if, as in the present example, only the default conduits are installed, the new conduit's name is set to "Conduit 4". This conduit's module is set to be the management agent 30, with a creator ID of "TIVO", which operates on files of extension. PCF stored in a "Tivoli" sub-directory for a device, FIG. 3.

At the same time users may already be connecting and synchronising unmanaged devices through the Palm desktop. When a device connects to an endpoint, it sets up a conduit mask defining which conduits are to execute when the device synchronises. Each conduit mask for a device comprises a Windows registry variable named "Installxxxx", whose value determines which of the defined conduits are to execute when HotSync executes for a device.

The string xxxx is linked with the device directory name, from which the Install, TCP and Tivoli sub-directories depend, through the file Users.dat. So once a device is synchronising with an endpoint, the association of the conduit mask and the device directory name is maintained by the Palm Desktop and the Palm Desktop API exposes this relationship. This enables any program, such as the Palm Desktop itself or modules such as TMPP.DLL to a) locate the conduit mask for a device; b) locate the sub-directory in which Palm files are stored for a device being synchronised; and c) determine the names of any devices (managed or unmanaged) connecting to the endpoint.

At the management server 10', an enabled endpoint which is to act or acts as a management agent for a device is either directly identified by a management server user, or the user can request specific endpoints or groups of endpoints to return the identities of devices that a) they manage; or b) connect to the endpoint, even if they are not currently managed. In the preferred embodiment, these identities comprise a triplet of the form <label><manager><Palm Desktop ID>. (The Palm Desktop ID comprises the Windows user ID of the owner of the Palm Desktop managing the device).

Thus, the management server can seek out the identities of devices connected to enabled endpoints, add the identities of any unmanaged devices to the device storage manager 32 and then configure the associated endpoints to manage these devices. This configuration comprises updating the conduit mask for the device on the endpoint via the program 34 or by any other program injected into the endpoint, to cause the Tivoli conduit to execute during synchronisation.

So it will be seen that without any intervention either on the device or on its associated endpoint, other than the user simply synchronising their device as normal, the endpoint has been set up to manage the device from the server in a No-Touch manner. The types of management that can be carried out on the device correspond to those normally carried out on managed endpoints, that is, software distribution, inventory and event monitoring. In addition, the preferred embodiment, enables the management server to configure individual or groups of devices and to remove databases/applications from devices.

Once a device 26 is associated with such an endpoint 14 which is to act as a management gateway, the simplest aspect of remotely and non-interactively configuring a Palm device via a tiered management structure is to distribute software applications. To deploy applications to the Palm device, the management server software distribution program 20' simply causes the appropriate .prc, .pdb and/or .pqa files to be placed in the Install directory for a device of group of devices. To do this, application files are supplied by the management server to an identified endpoint. An endpoint program in turn locates the appropriate Install sub-directory name for the device label supplied (again using the Users.dat information accessed via the Palm desktop API) and places the files in the sub-directory. When synchronisation next takes place with the device, the install conduit copies these files from the device's Install sub-directory on the endpoint to the device. It will be seen that this step requires no extra effort or intervention by the user of either the endpoint or the Palm device and so ensures that applications will be deployed to the Palm device at the very next opportunity, that is, the next synchronisation.

The conduit module 30 acting as the management gateway for the device also performs the functions of carrying out a software inventory, notifying events, configuring the Palm device and removing applications from the Palm device.

Figure 4:
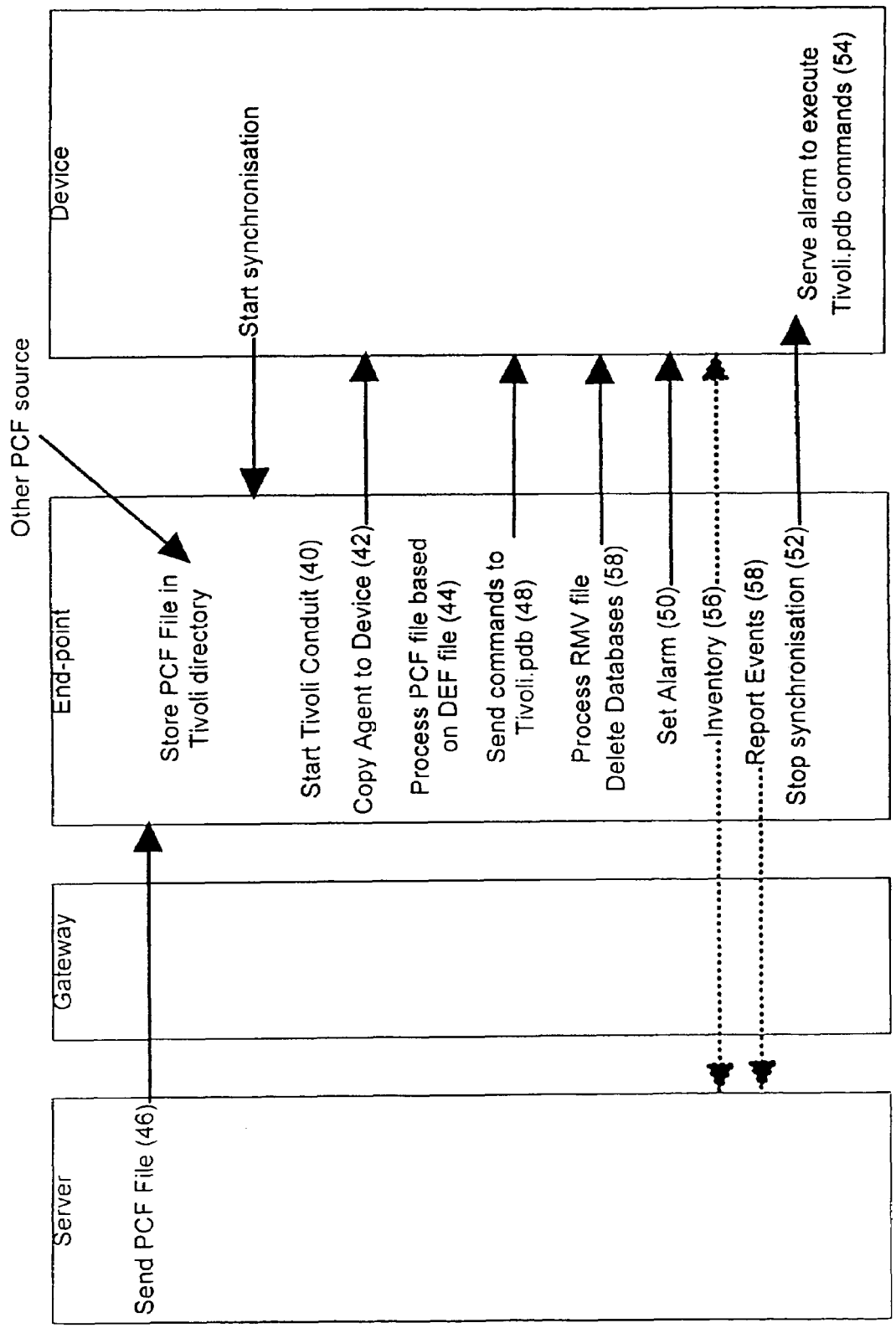
FIG. 4 is a flow diagram illustrating the operation of an endpoint management gateway.

In the present embodiment, the conduit module TMPP.DLL is instantiated during synchronisation of a device, step 40, FIG. 4. The module first checks the device to determine if an up-to-date copy of an agent Tivoli.prc 38 is available on the device. If not an up-to-date agent is copied to the Palm device, step 42. It should be noted that the conduit module does not rely on the Install conduit having copied Tivoli.prc to the device, as this would only make Tivoli.prc accessible to the install conduit module during that synchronisation cycle. If this approach were adopted, then either a second synchronisation cycle would be required or the install conduit module would need to be adapted to carry out the configuration otherwise performed by the conduit module. Nonetheless, should this restriction be lifted or not pertain for other device types, it would be possible to place the agent on the device using the install conduit and for the conduit module to communicate with the agent thereafter.

In any case, in the preferred embodiment, the conduit module 30 then processes any device configuration information, step 44, previously supplied from the management server 10' through the LCF 12 in the form of a .pcf file and placed in the Tivoli sub-directory for the device, step 46. It will be seen, however, that the configuration information can be supplied from any source, for example, a desktop user generated script file or via a desktop controller GUI. It should be noted that the conduit module can read from write locked device databases during synchronisation and this may be required to ascertain the version and thus the data structure of databases which are to be updated. Thus, during step 44, the conduit module can use the known structure of a database to be configured, to convert the configuration information into Palm device commands which it then writes to a device database Tivoli.pdb 39 again using the Palm desktop API, step 48. The conversion into Palm commands is done within the endpoint 14 as this both reduces the footprint required on the device and enables the PCF file to be written for more than one device independent of the versions of its databases. During synchronisation, the conduit module sets an alarm condition, step 50. The condition specifies the agent service the alarm with the alarm passing to the agent 38 a launch code parameter indicating that it is to service an alarm.

In the case of an alarm, the agent executes the commands stored in the temporary database 39. Thus, when the conduit module signals that synchronisation is complete, step 52, the databases locked during synchronisation are released, and so the database updating commands stored in the temporary database can be subsequently executed properly by the agent, step 54. Because the configuration commands execute automatically and immediately after synchronisation, it is also likely that the Palm device user will not be doing anything which is likely to lock a database, thus making configuration more likely to succeed.

The Palm commands generated generally comprise a sequence of: open database, write value, close database, although some configuration may result in single commands such as set network preference. In more detail, however, the syntax definition for the .pcf file is defined in Appendix A. (Some sections of the definition have been foreshortened for clarity with the deleted portions indicated by ellipsis.) This definition is stored in a local Tivoli.DEF file which is read and parsed by the conduit module, during step 44, thus enabling it to, in turn, parse and process the .pcf file. While the current definition is written to a bespoke grammar, it will be seen that the definition could be written in any suitable language, for example, Extended Mark-up Language, which in turn could be parsed by an off-the-shelf parser incorporated in the conduit module. Alternatively, the definition could be built into the conduit module, although this would make maintenance more difficult.

It can be seen from the definition file that ";" "*" and "|" are reserved characters, whose function is explained below, and that text following pound (#) is ignored. According to the syntax definition, .pcf files are divided into stanzas, each beginning with a label in square brackets, for example [SYSTEM]. Within each stanza, each line comprises an expression of the form "preference name=value". The conduit module associates each stanza label with either a database or a type of command, for example, [System] is associated with the "Saved preferences" database and [Network] is associated with the command "Set network preference".

Some databases, such as "Saved preferences" have multiple known versions each with a respective data structure. When the conduit module reads a stanza label for such a database, it tries to identify which version and thus which data structure is used by the database. In the case of "Saved preferences", each version is stored in the first two bytes of the database. The current syntax definition for SYSTEM allows the conduit module to operate with versions 3 to 7 of the Saved preferences database. For each version, the definition includes an associated sysStruct, telling the conduit module where variables are stored within the database. Each sysStruct element comprises a list of <preference name><offset><size> triplets, each separated by "|" char. A negative value in <size> means a bit position at the specified offset. So, for example, when the conduit module reads from a database, it knows where to look for the version information, and can determine, for example, that version 5 of Saved Preferences is being used. The conduit then knows that, for example, "dateformat" can be set by writing the 3rd byte of the database to the required value.

Each preference name can include a "*" character, and the conduit module is hard coded to recognise the string after the "*" letting it understand that special processing is required for that preference.

Possible values are separated by a semicolon, so for example, the first possible value for country is Australia and the next Austria. So, if a .pcf file included the following stanza:
 [SYSTEM]
 country=Austria and the Palm device were using version 5 of Saved Preferences, then the conduit would send the following (paraphrased) commands to the Tivoli Agent for storage in the temporary database 39:
 Open "Saved Preferences"
 Write 1 to location 2
 Close Database Each value can have aliases which are separated by "pipe" (|) char. So for example, the conduit will recognise that if "UnitedKingdom" or "United Kingdom" is specified, the same country value will be written in Saved Preferences. Also, a "*" char preceding a value means that it is the default value for that preference name. It means that a statement in the pcf file can indicate "preference name=default" and the value with the "*" will be set on the preference name.

Finally, some lists of values start with a ";" char because the internal representation of the preference name starts counting from 1 rather than 0. The ";" char can thus be inserted or deleted from the beginning of the value list for a preference value in the definition file, to shift values between those set on the Palm device and the configured ones in the pcf file.

Once the temporary database of configuration commands has executed, step 54, the agent finishes by deleting the temporary database and then optionally deleting itself, so removing any management system presence on the Palm device.

Another task of the conduit module is to cause applications and databases to be removed from the device. In the preferred embodiment, the management server places a .rmv file in the Tivoli sub-directory for the device. During synchronisation, the conduit module looks for such a file and, if found, reads the file to identify the database/applications to be removed. It then creates the appropriate Palm device commands and executes these, again through the Palm desktop API, step 58. The database/application remove commands are executed during synchronisation, in spite of the fact that the database/application may be locked. This is considered beneficial as if it is not possible to delete such a database/application, then the conduit module can in turn report back to the management server Event Console. This should cause the management server user to think about why they wish to delete a database/application which is in fact in use.

In the preferred embodiment, the device agent 38 can also be called during synchronisation. If the server program 22' requires an inventory of software on the device to be taken, then the agent is responsive to the conduit module 30 calling the agent 38 with a different launch code than that used for serving the alarm condition, step 56. The agent responds to this inventory launch code, prepares an inventory and returns this to the workstation, from where it is returned to the server 10' in a conventional manner.

The conduit module can also be extended notify any synchronisation events, such as the successful deployment of the database 39 or removal of databases, to the management server Event Console program 24', step 58, so ensuring that the complete range of management services for conventional endpoints can also be executed on pervasive devices.

Appendix A

[SYSTEM]

System preferences sysStruct[3]=|version,0,2|country,2,1|dateformat,3,1|longdateformat,4,1|weekstartday,5,1|timefor mat,6,1|numberformat,7,1|autooffduration,8,1|syssoundlevelv20,9,1|gamesoundlevelv20,10,1|alar msoundlevelv20,11, 1|hidesecretrecords,12,1|devicelocked,13, 1|localsyncrequirespassword,14,1|r emotesyncrequirespassword,15,1|sysprefflags,16,2|sysbatterykind,18,1|alloweastereggs,19,1|minu teswestofgmt,20, 4|daylightsavings,24,2|ronamaticchar,26,2|hard 1charappcreator,28,4|hard2chara ppcreator,32, 4|hard3charappcreator,36,4|hard4charappcreator,40, 4|calccharappcreator,44,4|hardcr adlecharappcreator,48, 4|launcherCharAppCreator,52,4|hardcradle2charappcreator, 56,4|animation Level,60,2|DateAndTime,0,0|| sysStruct[4]=|version,0,2| . . . |DateAndTime,0,0|| sysStruct[5]=version,0,2| . . . |staylitwhenpluggedin,77, 1|DateAndTime,0,0|| sysStruct[6]=version,0,2|country,2,1| . . . |antennacharappcreator,78,4|DateAndTime,0,0|| sysStruct[6]=version,0,2|country,2,1| . . . |measurementsystem,82,2|DateAndTime,0,0|| country*ctry=Australia;Austria; . . . ; UnitedKingdom|United Kingdom;UnitedStates|United States;India;Indonesia;Korea;Malaysia;RepChina;Philippines;Singapore;Thailand;Taiwan dateFormat=MDYWithSlashes|M/D/Y; . . . ;MYMed|MMM 'YY;MYMedNoPost|MMM YY longDateFormat=MDYWithSlashes|MM/DD/YY; . . . ; MYMedNoPost|MMM YY weekStartDay=Sunday|Sun;Monday|Mon timeFormat=Colon|12HH:MM; . . . ;Comma12h|12HH,MM numberFormat=CommaPeriod;PeriodComma; . . . ;ApostropheComma autoOffDuration=; 1 Minute|1|One Minute|1M; . . . ;3 Minutes|3|Three Minutes|3M sysSoundVolume*sv1=Off;Low;Medium;High gameSoundVolume*sv2=Off;Low;Medium;High alarmSoundVolume*sv3=Off;Low;Medium;High beamReceive*be=No|False|0|*Off;Yes|True|1|On stayonwhenpluggedin=No|False|0|*Off;Yes|True|1|On staylitwhenpluggedin=No|False|0|*Off;Yes|True|1|On alloweastereggs=No|False|0|*Off;Yes|True|1|On hidesecretrecords=No|False|0|*Off;Yes|True|1|On DateAndTime*dt=*now|local|PC

Following values for creators must be considered as default and not as a set of possible values. They are CASE SENSITIVE hard1charappcreator*cr=*date hard2charappcreator*cr=*addr hard3charappcreator*cr=*todo hard4charappcreator*cr=*memo calccharappcreator*cr=*calc hardcradlecharappcreator*cr=*sync launcherCharAppCreator*cr=*lnch hardcradle2charappcreator*cr=*sync measurementSystem=unitsEnglish|inches; unitsMetric|meters

[NETWORK]

Network Preferences. Note: all the settings for the services are done by pnc files. With the keyword of this section the service can enabled/selected.

service*se=*Windows RAS

[MODEM]

Modem Preferences modStruct[2]=|version,0,2|speed,2,4|speakervolume,6, 1|pulse,7,1|flowcontrol,8,1|resetstring,9,18|initstring,28, 81|country,0,0|modemname,0,0|| cDBStruct[0]=|modemname,0,22|connectionmethod,22, 4|speed,26,4|defconf,30,1|is Modem,31,1|pulse,32,1|country, 33,1|speakervolume,34,2|flowcontrol,36,2|resetstring,38, 8|initstring,46,81|| country*co=Argentina;Australia;Austria; . . . ; UnitedKingdom|United Kingdom;UnitedStates|United States;*other connectionmethod*fv=*u8EZ is Modem=*false|no;true|yes modemname*fvmo=*Standard speed*sp=115200;*57600;38400;28800;19200;14400; 9600;4800;2400;1200 speakervolume=off;*low;medium;high pulse=*touchtone;rotary flowcontrol=*auto;off;on initstring*fvis=*AT&FX4 resetstring*fvrs=**NC1

[HOTSYNC]

Hotsync Preferences hotmStruct[1]=|version,0,2|pad 1,2,1|modemsyncpref,3, 1|pad 1,4,1|hotsynctype,5,1|localconnectio n,6,22|modemdirectConnection,28,22|modemnetservice,0,0|primarypcname, 0,256|primarypcaddress,0,16|prima hotpStruct[2] =|dialprefix,2,-8|disablecallwaiting,2,-7|usecallingcard,2,-6|modemdirectphone,4,41|dialprefixvalue,45, 41|disablecallwaitingvalue,86,41|useCallingCardvalue,127, 41|| modemDirectPhone*fv=*00 dialprefix=*false|no;true|yes dialprefixvalue*fv=*9, disablecallwaiting=*false|no;true|yes disablecallwaitingvalue*fv=*1170, usecallingcard=*false|no;true|yes usecallingcardvalue*fv=*,,,, modemDirectConnection*fvdc=*Palm V Modem # only PalmOS 3.3 and later modemNetService*fvns=*Windows RAS localConnection*fvlc=*Direct Serial|IR to a PC/Handheld hotsyncType*hsty=*local;modem modemSyncPref=*network;modem LANSyncPref*ls=local|final;LANSync|proxy primaryPcName*fvpn=*localhost primaryPcAddress*fvpa=*127.0.0.1 primaryPcSubnetMask*fvps=*255.255.255.0

[AUTOPALM]

makeimage*pwmi=*h:/Palm/image pcfname*pwpn=*_delta_.pcf if a path isn't specified, the file is created in image dir makepcf*pwmp=*h:/Palm/image set*pwsb=0:0:0@0,0   #Card:DB:Rec@Offset,byte, byte@Offset,byte . . .

What is claimed is:

1. For managing pervasive devices, a gateway component resident on a workstation, said gateway component being instantiable during synchronisation of said workstation with a pervasive device and comprising:
- means for transferring a device agent to a pervasive device;
- means for transmitting configuration information to the device agent, said agent comprising means for executing configuration commands in response to the configuration information received from the gateway component
- means for receiving a file from a management server including the address of a specific pervasive device and one or more commands;
- means for generating device-specific commands based on the received file; and
- means for forwarding the device-specific commands to the device agent at the specific pervasive device identified in the file received from the management server, said device agent executing the device-specific commands as they are received.

2. A gateway component as identified in claim 1 wherein the commands comprise commands for removing files from the specific pervasive device.

3. For managing pervasive devices, a gateway component resident on a workstation, said gateway component being instantiable during synchronization of said workstation with a pervasive device and comprising:
- means for transferring a device agent to a pervasive device;
- means for transmitting configuration information to the device agent, said agent comprising means for executing configuration commands in response to the configuration information received from the gateway component;
- means for receiving a file from a management server including the address of a specific pervasive device and one or more commands;
- means for generating device-specific commands based on the received file; and
- means for forwarding the device-specific commands to the device agent at the specific pervasive device identified in the file received from the management server, said device agent storing the device-specific commands for execution after all are received.

4. A gateway component as identified in claim 3 wherein the commands comprising database or application configuration commands.

* * * * *